US008565810B1

(12) United States Patent  (10) Patent No.: US 8,565,810 B1
Giles et al.  (45) Date of Patent: Oct. 22, 2013

(54) SYSTEMS AND METHODS FOR MANAGING EVENT RELATED MESSAGES USING A MOBILE STATION

(75) Inventors: Linda Stanley Giles, Powder Springs, GA (US); Coulter C. Henry, Jr., Marietta, GA (US); Robert Z. Evora, Douglasville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1171 days.

(21) Appl. No.: 11/923,015

(22) Filed: Oct. 24, 2007

(51) Int. Cl.
*H04M 1/00* (2006.01)
(52) U.S. Cl.
USPC .......................................... 455/550.1
(58) Field of Classification Search
USPC ............ 455/414.1, 412.2, 413, 550.1, 90.1, 455/403, 412.1, 414.3, 418, 422.1, 424, 455/425, 456.5, 456.6, 463, 466; 370/310, 370/310.2, 312, 328, 338
See application file for complete search history.

(56) References Cited

U.S. PATENT DOCUMENTS

| 6,006,087 | A | 12/1999 | Amin |
| 6,438,217 | B1 * | 8/2002 | Huna ........................ 379/88.14 |
| 6,731,725 | B1 | 5/2004 | Merwin et al. |
| 7,046,769 | B2 | 5/2006 | Merwin et al. |
| 7,251,480 | B1 | 7/2007 | Oh et al. |
| 7,356,490 | B1 * | 4/2008 | Jacobi et al. ................. 705/26.8 |
| 2002/0001369 | A1 | 1/2002 | Merwin et al. |
| 2002/0016163 | A1 * | 2/2002 | Burgan et al. ................ 455/412 |
| 2002/0143644 | A1 * | 10/2002 | Tosun et al. ..................... 705/26 |
| 2002/0160756 | A1 | 10/2002 | Amin |
| 2004/0128197 | A1 * | 7/2004 | Bam et al. ....................... 705/14 |
| 2004/0186889 | A1 * | 9/2004 | Washburn ..................... 709/206 |
| 2005/0182767 | A1 * | 8/2005 | Shoemaker et al. ........... 707/10 |
| 2005/0267809 | A1 * | 12/2005 | Zheng ............................. 705/14 |
| 2006/0116111 | A1 | 6/2006 | Klicpera |
| 2007/0070940 | A1 * | 3/2007 | Vander Veen et al. ........ 370/328 |
| 2007/0282959 | A1 * | 12/2007 | Stern ............................ 709/206 |

OTHER PUBLICATIONS

Voicemail from Wikipedia, the free encyclopedia, 2007, 17 pages.

* cited by examiner

*Primary Examiner* — Wesley Kim
*Assistant Examiner* — Dinh P Nguyen
(74) *Attorney, Agent, or Firm* — Hartman & Citrin LLC (57) ABSTRACT

A system and method for managing an event related message by a user of a mobile station connected to a network is disclosed. The system and method provides a user with the ability to pre record a message to be delivered at a date associated with an event pertinent to the recipient of the message. A reminder capability for other contacts about the event is provided as is a merchandizing capability for the network operator.

25 Claims, 6 Drawing Sheets

SYSTEMS AND METHODS FOR MANAGING EVENT RELATED MESSAGES USING A MOBILE STATION

FIELD OF THE INVENTION

This invention relates generally to the delivery of content and services to users of mobile stations (MS), such as mobile telephones. More specifically, the present invention relates to systems and methods to provide users with the capability to mange the future delivery of messages to the user's contacts on dates associated with events related to the contact.

BACKGROUND OF THE INVENTION

The use of MS, e.g., mobile telephones, personal data assistants (PDAs), laptop computers, Internet appliances, etc., has increased significantly over the years. Over two thirds of the U.S. population carry mobile telephones, and many individuals use their mobile telephone as their primary communication device.

Many MS devices include special computer-enabled features. In addition to functioning as an ordinary mobile telephone, an MS with computer-enabled features may include wireless e-mail, Internet, Web browsing, and fax. Web browsers are software applications that enable the user to display and interact with text, images, and other information typically located on a web page at a website on the World Wide Web or a local area network. Text and images on a web page can contain hyperlinks to other web pages at the same or different website. Web browsers allow the access information provided on many web pages at many websites by traversing these links. Web browsers format HTML information for display, so the appearance of a web page may differ between browsers. Many web sites offer content, products and software for sale that a user may want to access or purchase. For example, mobile telephone subscribers may be able to purchase and download a myriad of ring tones and games to their mobile telephone from a service provider web site.

There are a variety of ways that mobile telephone users can have messages delivered to another user, including voicemail, e-mail, text, image and video messaging. The user of a mobile telephone may, for example, access the Internet, access an e-mail website, type a message using the key pad of the mobile telephone and have the message delivered to the e-mail address of the other user. Another way that a mobile telephone may be used to deliver a message is through the use of text messaging. Text messaging or Short Message Service (SMS) enables the user to send messages of up to 160 characters. A service center associated with the mobile network receives, stores and forwards short messages received from a mobile telephone. If the recipient is not available, the service center will retry to send a message at a later time. Another way of delivering a message is through the use of a voicemail system. A message may be sent to another user or by accessing a voicemail system, logging in with an appropriate ID and password, recording a message and instructing the voicemail message to send it to the other user by inputting a voicemail destination address (usually the other person's extension). Many of these messaging systems enable the user to schedule a future delivery of the message. For example, some voicemail systems enable the user to record a message, input the delivery address (usually a phone number), and program to deliver each date and time. There are also applications that allow computer users to compose e-mails and have them delivered at a specified time in the future.

Many mobile telephones allow the user to program a list of contacts on the device. A typical entry in a contacts list would include the name of the contact, and the telephone number of the contact. The contact lists may include fields for the category of contact (business, personal, etc.) and the type of telephone number for the entry (work, home, mobile).

The expansion of the use of the Internet, e-mail, voicemail, social networking sites, mobile telephones and other appliances of modern life has resulted in changes to social interaction. It has been advanced that individuals have larger social networks with weaker ties. Weak ties may be mere acquaintances, as opposed to strong ties that include close friends or family members.

There is a need to provide users with a user friendly capability to maintain and nurture the strong ties in their social network. One way of reinforcing strong ties is to promote contact between the user and members of the social network at significant events associated with the member of the social network. For example, birthdays, anniversaries, Father's Day, Mother's Day, and other events provide an opportunity for members of a social network to interact and nurture the strong ties. However, busy schedules many times prevent this kind of interaction.

There is a need to provide a user friendly method to enable a person to maintain contact with strong ties in their social network by providing a messaging capability associated with significant events. There is a need to enable mobile telephone users to use their mobile telephones as an appliance for messaging members of their social network upon the occurrence of significant events. There is a need to enable mobile telephone users to effectively manage their social network through an easy-to-use and effective messaging capability.

SUMMARY OF THE INVENTION

The following summary is a simplified summary of the invention in order to provide a basic understanding of some of the aspects of the invention. This summary is not intended to identify key or critical elements of the invention or to define the scope of the invention.

This invention relates to a system for managing an event related message by a user of a mobile station connected to a network by accessing a contact list on the mobile station, selecting a contact and destination address and associating an event and a date with a message. The systems also include subsystems that prompt the user and allow the user to send event reminders to other contacts.

The invention also relates to a method for managing an event related message by a user of a mobile station connected to a network by accessing a contact list on the mobile station, selecting a contact and destination address and associating an event and a date with a message.

One aspect of the invention is the ability to merchandise event related goods and services to the user at or near the time of the event.

Other and further aspects of the present invention will become apparent during the course of the following description and by reference to the attached drawings.

DETAILED DESCRIPTION OF ILLUSTRATIVE EMBODIMENTS CELLULAR NETWORK

Figure 1:
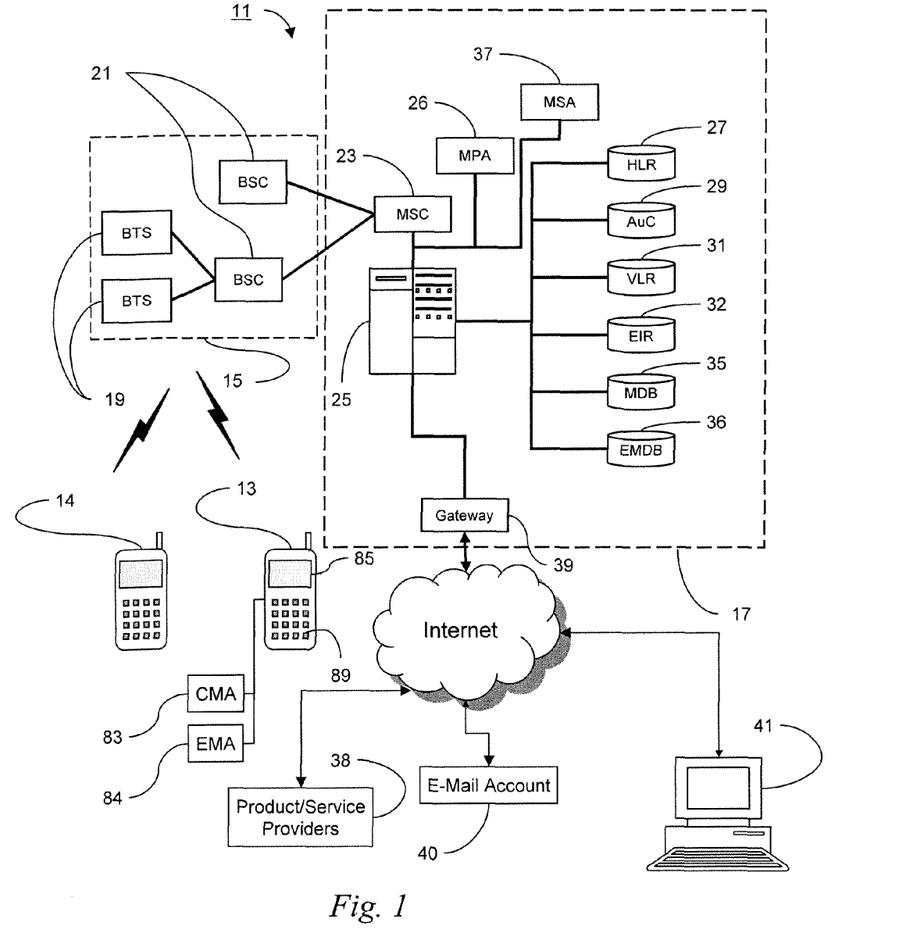
FIG. 1 illustrates the components of a typical cellular network.

Cellular Network Illustrated in FIG. 1 is a typical cellular communication system 11. The system 11 includes a plurality of MS 13, and 14 (only two are illustrated); a base station subsystem 15; and a network subsystem 17. The components described in FIG. 1 for the base station subsystem 15 and network subsystem 17 are illustrative of just one example of a cellular network. There are a number of different digital cellular technologies that have been developed and are presently commercially employed. These technologies include: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), UMTS, HSDPA, Digital Enhanced Cordless Telecommunications (DECT), Digital AMPS (IS-136/TDMA), and Integrated Digital Enhanced Network (iDEN). Although these technologies may employ different components, it would be readily apparent to one of ordinary skill in the art that the systems and methods described below could be employed with any of the wireless technologies.

In one example of a wireless cellular system the exchange of data between the wireless mobile devices and the wireless cellular network is accomplished utilizing one of a number of standard formats through the wireless network including base station subsystem 15 and network subsystem 17. In an exemplary system, a typical base station subsystem 15 includes a plurality of base transceiver stations (BTSs) 19 served by a Base Station Controller (BSC) 21. The BTSs 19 are transmitter/receivers used to transmit and receive signals over the radio interface section of the network. The BSC 21 controls communication between a group of BTSs 19 and a Mobile Switching Center (MSC) 23. The BSC 21 also performs radio signal management functions for the BTSs 19, managing functions such as frequency assignment and handoff. The MSC 23 sets up and maintains calls made over the network. In a GSM system a network switching subsystem would perform a similar function as the MSC 23. If the cellular network uses General Packet Radio Service (GPRS) the BSC 21 may be a Serving GPRS Support Node (SGSN). The BTS 19 defines a cell and handles the radio link protocol with the wireless mobile devices 13. The BSC 21 manages the radio resources for one or more BTS devices 19 as well as radio channels set up, frequency hopping, and handovers. The BSC 21 connects the MS 13 and/or 14 with the MSC 23 of the network subsystem 17. As stated previously this is just one example of the components of an exemplary cellular system. The present invention is not limited to the type of system utilized or the standards used by the system. It would be apparent to one of ordinary skill in the art to implement the methods and systems described in a variety of cellular systems using various standards.

One component of the example network subsystem 17 is the MSC 23. The MSC 23 acts as a switching node and additionally provides all of the processes needed to handle an MS 13, such as registration, authentication, location updating, handovers, and call routing. Also included in the network subsystem 17 would be one or more processing units 25 such as a server. Information from the MSC 23 is processed by the processing unit 25. Network subsystem 17 may also include a message processing application (MPA) 26 that controls the storage and delivery of messages from the user of the MS 13. Also accessible by the processing unit 25 is a home location register (HLR) 27. The HLR 27 is a database that contains data relating to the local subscriber and may include subscriber information such as directory number, electronic serial number of the MS 13, and services or features the subscriber is assigned. The HLR resides in the wireless network that contains service profiles and is used to check the identity of a local subscriber. The network subsystem 17 also includes an authentication center (AuC) 29. The AuC 29 is used during initial access to authenticate the user by means of an ESN, SID and MIN. The AuC 29 maintains a list of ESNs and MINs for each subscriber and network. The AuC 29 is used in the verification process to assure that a wireless device and its user are compatible with and authorized to access a wireless network. This process is accomplished through transmission of identifying data at the time of connection. The network subsystem 17 also includes a visitor location register (VLR) 31 that includes information from other systems' HLRs necessary to deliver the subscribed services and control the calls for each MS 13 within a specified geographical area. The VLR 31 is a network database that holds information about roaming wireless customers.

Another database included in the network subsystem 17 is the equipment identity register (EIR) 32. The EIR 32 contains a list of all valid MSs 13 on the network. Also illustrated in FIG. 1 is a message database (MDB) 35 that stores event related messages and metadata associated with the messages. Yet another database that may be included in the network subsystem 17 is an event marketing database (EMDB) 36. The EMDB 36 stores data associating events with products or services that may be desired by users upon the occurrence of the event. For example, if the event is Mother's Day, then the user may be offered a product or a service from Product/Service Providers 38 by means of a merchandising service application (MSA) 37 to send flowers to the user's mother. Similarly if the event is a birthday, the user may be offered the ability to select between a variety of goods and services to be delivered to a message recipient that has a birthday occurring on that date. The MSA 37 would access a product/service provider web site to access content related to products or services relevant to the event that may be offered to the user, or alternately include a link to the web site in a message to the EMA 84. The network 17 may be connected to the Internet through a gateway 39 that may provide access to the e-mail account 40 of a user computer 41. Further details of the methodology and systems for accomplishing those results are set out below.

The MS may include a microprocessor and a contact management application (CMA) 83 and an event related management application (EMA) 84. It should be understood by one of ordinary skill in the art that although the CMA 83 and EMA 84 are shown as two separate applications, they may be combined into a single application or may be combined with other applications of the MS 13.

Contact Management

Contact management applications are ubiquitous. Most e-mail software, such as Microsoft Outlook, have a contact management application that allows the user to maintain a database of information about contacts. Similar applications exist for other electronic appliances selection as PDAs, mobile phones, and the like. Many of these applications support the Vcard format, that is a standard format for personal data interchange. The Vcard format includes records for addresses, including business, home, mailing addresses to be associated with an individual's name. The Vcard format also includes records for telephone numbers including home, business, fax, mobile, and the like. Additional information may also be associated such as event dates like anniversaries, birthdays, and similar events that may be associated with the individual.

Event Management

Figure 2:
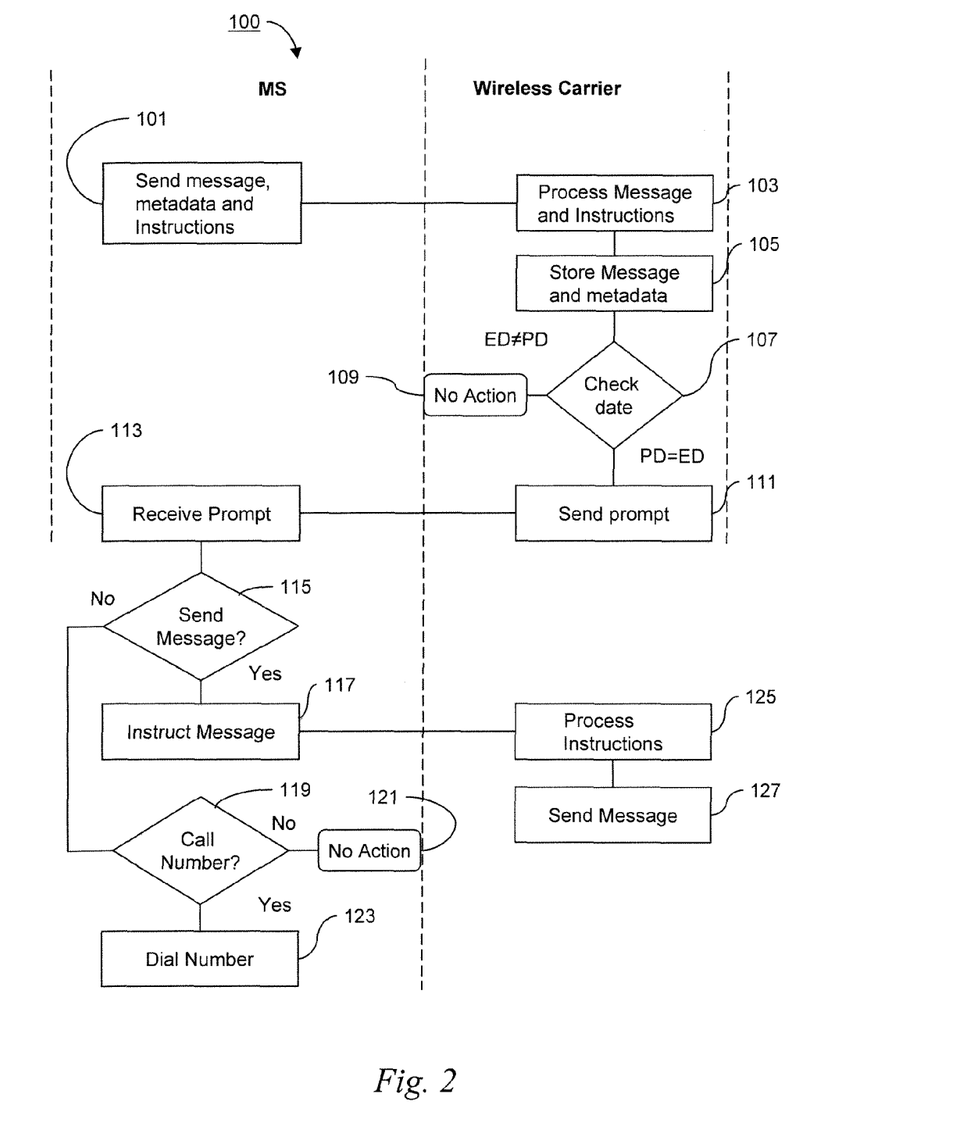
FIG. 2 is a high level flow diagram of the methodology for managing event related messages using a mobile station.

Illustrated in FIG. 2 is an exemplary methodology 100 that would be implemented by a system and method for managing event related messages using a mobile station. The user of the mobile station would employ the EMA 84 (illustrated in FIG. 1) to send a message, metadata, and instructions (method element 101) to the wireless carrier. The MPA 26 (illustrated in FIG. 1) associated with the network subsystem 17 of the wireless carrier receives and processes the message, metadata and instructions (method element 103) and stores the message and the metadata associated with the message (method element 105). The MPA 26 would periodically trigger a comparison of an event related date in the metadata with the current date (decision note 107). If the two dates are not the same no action would be taken (method element 109). If the two dates are the same, then the MPA 26 would send a prompt (method element 111) to the user associated with the message and metadata. The user's EMA 84 would receive and display a prompt on the MS 13 (method element 113). The user would be presented with an option (decision note 115) to instruct the MPA 26 to deliver the message to the intended recipient (method element 117) or to be provided with an option to call the recipient directly without instructing delivery of the message (decision note 119). If the user opts not to pull the number directly no further action would be taken (method element 121). If the user opts to contact the recipient directly, the recipient's number would be automatically accessed and dialed by the MS 13 (method element 123). Alternately, the user may, upon being provided the option (decision note 115) to send a message, provide instructions that the message be sent (method element 117). The instruction would be received by the MPA 26 for process (method element 125) and the message would be sent to the contact (method element 127).

The usefulness of the foregoing systems and methodologies can be illustrated by the following example. The user maintains a contact list that includes the names and addresses and phone numbers of relatives and friends. The contact management system is provided with data fields to associate a birth date, an anniversary date, or other event that is relevant and significant to a contact. For example, the contact may be the mother of the user, and the event may be her birth date. The user, utilizing the EMA 84, may record a message, associate the message with the contact (the mother), associate the event type (birthday) with the message, and associate in the event date (birth date) with the message. The message may be a voicemail recording, for example "Happy birthday mom," an e-mail, a text message, an image message such as an image of a birthday card, or a video message where the user records a video wishing his or her mother a happy birthday. The EMA 84 would then send the message and related data in accordance with method element 101. On the user's mother's birthday, the user would receive a prompt requesting instructions on whether to send the message or provide the user with the opportunity to call his or her mother at that time.

In an alternate embodiment, the user may designate a subset of the user's contact list as recipients of a reminder of the event. The message, metadata and instructions 101 in FIG. 2 would include the contact information for the subset of the user's contact list. In that case, the user and the subset of the user's contact list would receive the prompt 113 and be given the opportunity to send their own message, call the person associated with the event, or append a message to the user's message. In the example discussed in the preceding paragraph, on the user's mother's birthday, the user, and other contacts designated by the user (e.g. siblings, close friends and the like) would receive a prompt requesting instructions on whether to send a message or provide the designated contacts with the opportunity to call the user's mother at that time.

Although the foregoing example illustrates the use of the methodology and system with contacts that are family relations, the same methodology and system can be used for acquaintances, business relationships, and other network groupings such as sports teams or social organizations. For example, a wireless carrier may send a message to one or more users on the anniversary date of the users' subscription to the service. This message may include offers of additional services, discounts, or other marketing material.

As will be described in more detail below, the messages sent by the user utilizing the MS 13 in method element 101 may be text messages, image messages, voice messages, e-mail, video messages, and other types of messages that may be in digital or analog form.

Event Management System

Figure 3:
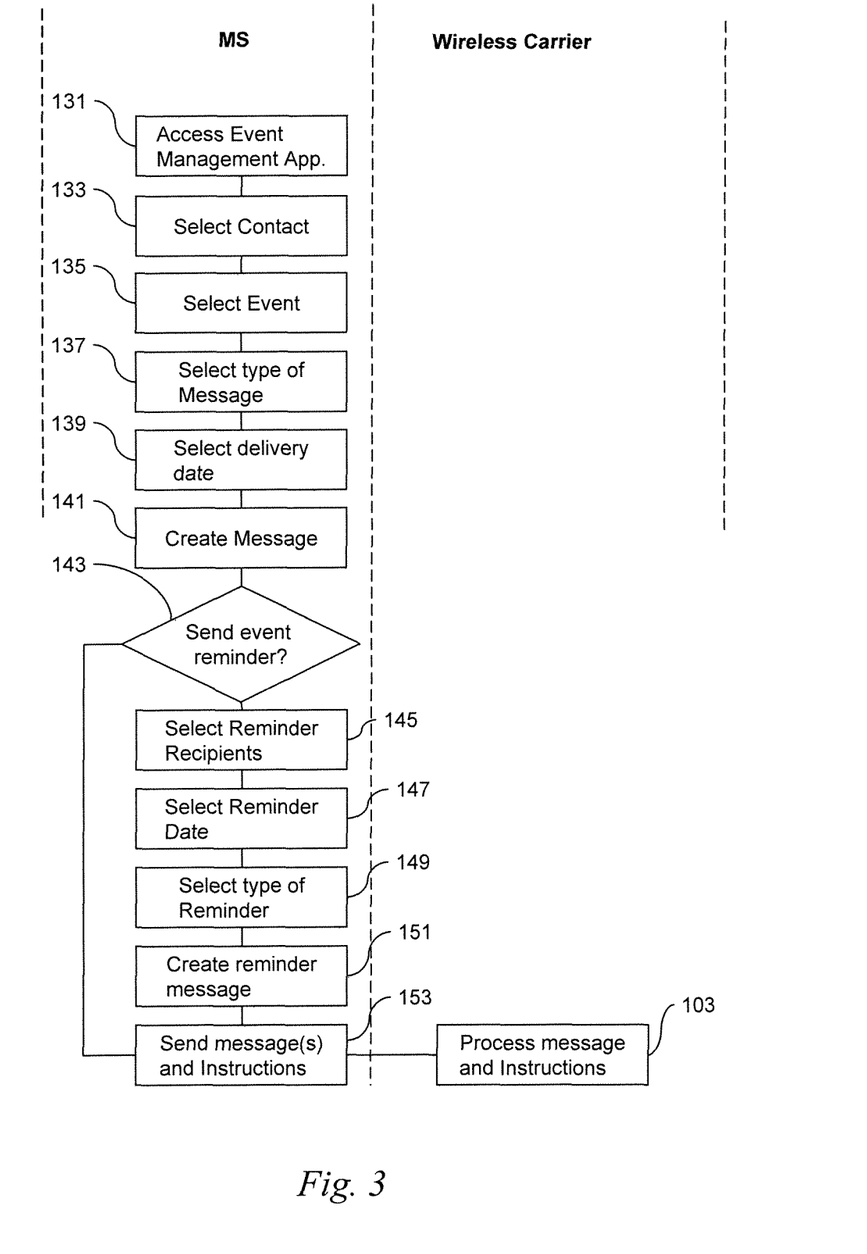
FIG. 3 is a high level flow diagram of the methodology employed by an event management application in a mobile station.

Illustrated in FIG. 3 is a methodology implemented by the EMA 84 in FIG. 1. The user would use the MS 13 to access the EMA 84 (method element 131). The EMA 84 preferably provides a graphical user interface to guide the user through the selections and data input required to manage messages related to an event. The user selects a contact to which the message would be directed (method element 133). The user also selects an event to be associated with the contact and the message (method element 135). For example, a graphical user interface may provide a drop down menu of the events associated with the contact, such as birthdays and anniversaries and the like. The dates associated with the events would be maintained in a data store associated with the CMA 83. The user may be provided with an option to select the type of message to be delivered (method element 137). For example, the user may select from a menu that includes voicemail, e-mail, text, image or video messaging. The user may also be provided with an option to select a delivery date for delivery of the event related message (method element 139). The delivery date may default to the date of the event. The user would then be cued to create the message which may be a voice recording, an e-mail, a text message, an image or a video message (method element 141).

In one embodiment of the CMA 83, the user may be provided with the option to send event reminders to one or more additional contacts (decision node 143). For example, a user may also want to record a reminder to the user's sibling to remember their mother's birthday. If the user elects to send reminders, the user would be provided with a menu to select one or more recipients of a reminder (method element 145). This can be accomplished through a search of the CMA 83 to identify the individuals listed in the contacts database that are to be identified as recipients of the reminder message. The user then selects a reminder date (method element 147). The reminder date may default to the event date. The user may then be provided with an option to select the type of reminder (i.e. voicemail, e-mail, text message) (method element 149). The message can then be created using the input device 89 of the MS 13. The CMA 83 can then be instructed to send the message, the data associated with the message, the reminder message, and the data associated with the reminder message along with instructions (method element 153) to the wireless carrier. The MPA 26 in the wireless carrier may then implement the methodology illustrated in FIG. 2, for each designated recipient of the reminder, so that each designated recipient would receive a prompt (method element 113). If the designated recipient has a CMA 83, they can also be provided with an option to record and send a message (method element 117), call the person associated with the event directly (method element 123), or to append a message to the original user's message for delivery to the person associated with the event.

Figure 4:
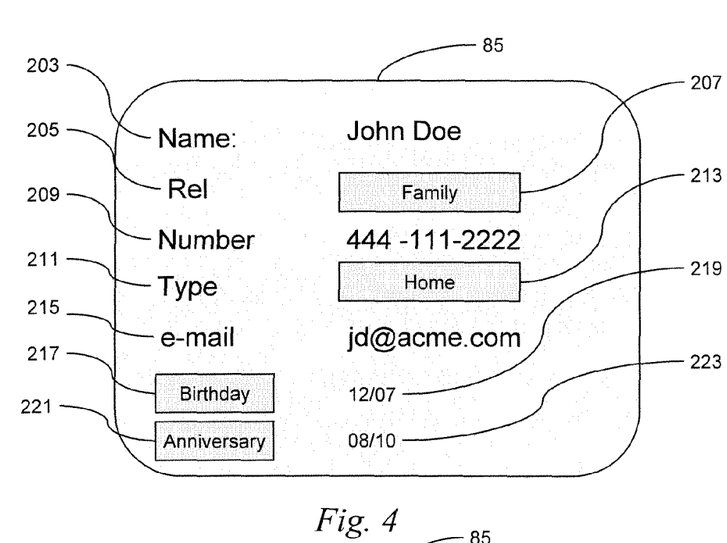
FIG. 4 is an exemplary display of a contact management application for use with a system for managing event related messages using a mobile station.

FIG. 4 illustrates an exemplary display of data from a CMA 83. The data would be displayed in the display 85 of the MS 13. Typical contact information would include the name of the contact 203, and may include the relationship of the contact 205. The relationship of the contact may be assigned by a drop down menu 207 with a limited choice of relationship types. The display may also include the display of a telephone number 209, an indication of the type of number 211, (e.g. home, office, mobile), which may also be assigned by means of a drop down menu 213. The data may also include the contact's e-mail address 215, as well as one or more events associated with the contact. For example illustrated in FIG. 4 is the event "birthday" 217, with an associated date 219. Also illustrated is the event "anniversary" 221 with the associated date 223.

Figure 5:
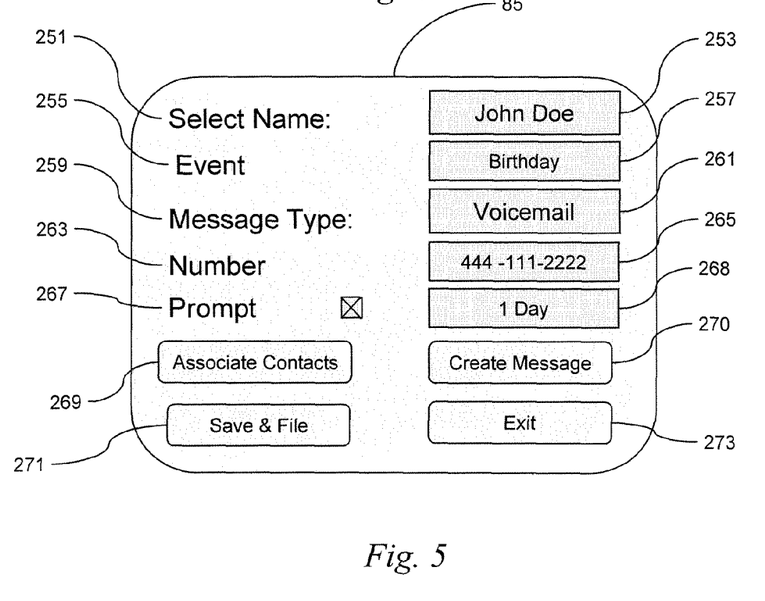
FIG. 5 is an exemplary display of an application for managing event related messages using a mobile station.
Figure 6:
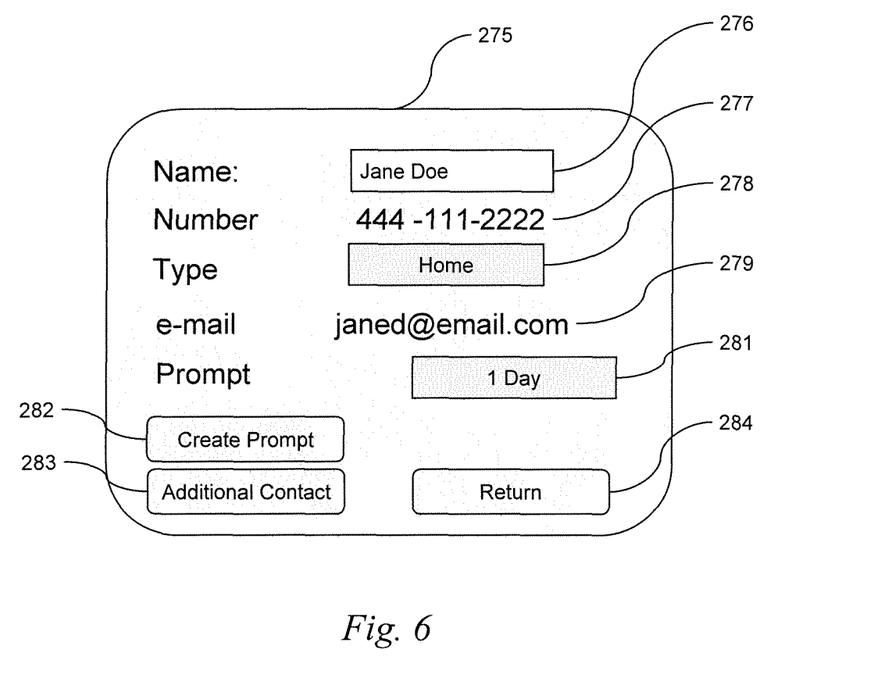
FIG. 6 is an exemplary display of an application for associating contacts to receive prompts related to an event.

FIG. 5 illustrates an illustrative display of a user interface that may be provided by the EMA 84. The user would be presented with a capability of selecting a name 251 which may be accomplished by a drop down menu 253 or a hyperlink to a search engine that can search the CMA 83 by using the contact's first or last name. The user interface also provides the functionality to assign an event 255 such as for example through the use of a drop down menu 257. The user can select a message type 259 from the list of options that may be provided for example through a drop down menus 261. The telephone number 263 of the contact may also be provided along with an option to select among alternative numbers (such as home, office, mobile) by means of a drop down menu 265 or other selection mechanism. Additionally, the user may be provided with the option to elect to receive a prompt 267 before the message is delivered to the contact. Optionally, the user may be provided with a drop down menu 268 enabling the user to select the number of days before the event that the prompt will be delivered. The user is also presented with an Associate Contacts link 269 that enables the user to link a subset of the user's contacts with the event so that they can receive reminders of the event. Activation of the Associate Contacts link 269 results in the user being presented a new interface, that is illustrated in FIG. 6 and further described below. The user interface may also include a Create Message link 270 that would engage a voicemail system if the type of message is voicemail, or an e-mail or text message system if those are selected as the type of message. After recording the message the user may select the save and file link 271 that sends the message, metadata and instructions to the carrier. After the user has finished the user may press the exit link 273 that will return the display 85 to the normal MS display.

Illustrated in FIG. 6 is a user interface 275 for associating contacts that receive a prompt relating to the event. The interface may include a fill in name field 276 that enables the user to input a name to search for in the CMA 83. Upon the selection of the name the display would return the contact's telephone number 277, or if there are more than one number, a drop down menu 278 to select which of the plurality of numbers associated with the contact should receive the prompt. The user may be provided with another drop down menu 281 that enables the user to select how many days in advance of the event the contact should be prompted. A create prompt link 282 may be provided for the user to record a voicemail prompt or a text message or e-mail prompt. A link to create additional contacts 283 is provided for the user to be able to associate multiple contacts to prompt about the event. Finally, a return link 284 may be provided to return the user to the interface illustrated in FIG. 5.

Event Related Merchandising

Figure 7:
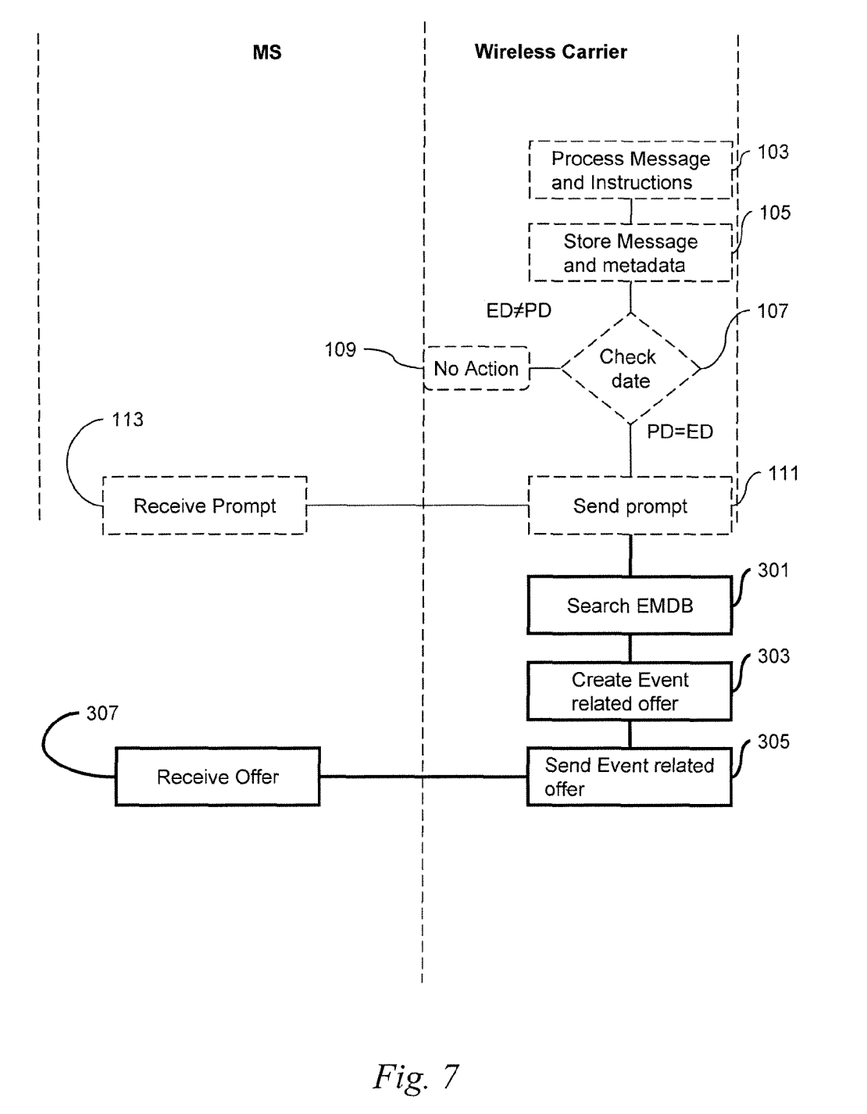
FIG. 7 is a high level flow diagram of an alternate methodology for managing event related messages using a mobile station.

Illustrated in FIG. 7 is an alternate embodiment of a methodology to be implemented by an MPA 26, that includes merchandising products or services to the user based on the event type. The methodology illustrated in FIG. 7 has significant commonality with the methodology illustrated in FIG. 2. The common method elements are illustrated in dashed blocks, while the elements of the alternate embodiment are illustrated in solid blocks. In the embodiment illustrated in FIG. 7, after the MPA 26 sends a prompt to the user (method element 111), the MPA 26 searches for the EMDB 36 to identify products or services offered by Product/Service Providers 38 associated with the event that may be offered to the user. For example, the event may be Mother's Day and the offer may be flowers, alternately, the event may be Valentine's Day and the offer may be chocolates. The MPA 26 would then create an event related offer (method element 303) and would communicate the offer to the user and the contacts designated by the user (method element 305). The user and the contacts designated by the users would receive the offer (method element 307) which will be displayed on the MS 13 display. Although the representative embodiment described in FIG. 7 illustrates method element 301 as following method element 111, it would be apparent to one of ordinary skill in the art that this search and creation of an event related offer may take place before or after sending of the prompt, or before the event.

The above description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other networks, not necessarily the cellular network described above.

The various embodiments described above can be combined to provide further embodiments. Aspects of the invention can be modified, if necessary, to employ the systems and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all systems that operate under the claims to provide a method for delivering text messages and multimedia content to a mobile station from a broadcast network in an efficient manner with improved delivery reliability. Accordingly, the invention is not limited by the disclosure, but instead the scope and definition of the invention is determined entirely by the following claims.

What is claimed:

1. A method comprising:
accessing a contact list on a mobile station, the mobile station including a user interface for:
selecting a contact from the contact list,
selecting a destination address for the contact, associating an event with the contact,
associating a first date on which to prompt a plurality of secondary mobile stations with the event,
associating a second date with the event,
creating a message to be delivered to the contact, on the second date, and sending an instruction to a network to prompt the plurality of secondary mobile stations to create at least one secondary message on the first date, and to send the message and the at least one secondary message to the contact on the second date; and
receiving a prompt on the second date from the network before sending the message to the contact, the prompt including an event related offer suggesting purchase of at least one of a product and a service related to the event;
wherein the event related offer is identified by an event marketing database associating the event with the at least one product and service related to the event.

2. The method of claim 1 wherein the user interface is further for:
selecting at least one reminder contact from the contact list; and
selecting a destination address for each the reminder contact.

3. The method of claim 2 wherein the user interface is further for creating a reminder message for each of the reminder contacts.

4. The method of claim 1 wherein the prompt includes an option to send the message through the network to the destination address.

5. The method of claim 1 wherein the prompt includes an option to connect directly to the destination address.

6. The method of claim 1 wherein the message is at least one of a voice message, an image message, a video message and a text message.

7. The method of claim 1 wherein the message is a text message.

8. The method of claim 1 wherein the destination address is a telephone number.

9. A mobile station comprising:
a processor; and
a memory that stores computer executable instructions that, when executed by the processor, cause the processor to perform operations comprising
accessing a contact list on the mobile station, the mobile station including a user interface for the selection of a contact from the contact list, the selection of a destination address for the contact, the association of an event with the contact, the association of a first date on which to prompt a plurality of secondary mobile stations with the event, the association of a second date with the event, and the creation of a message to be delivered to the contact on the second date,
sending instructions to the network to prompt the plurality of secondary mobile stations to create at least one secondary message on the first date, and to send the message and the at least one secondary message to the contact on the second date,
receiving a prompt from the network, and
displaying the prompt from the network before sending the message to the contact, the prompt including an event related offer suggesting purchase of at least one of a product and a service related to the event wherein the event related offer is identified by an event marketing database associating the event with the at least one product and service related to the event.

10. The system of claim 9 wherein the user interface is further for the selection of at least one reminder contact from the contact list, and the selection of a destination address for each the reminder contact.

11. The system of claim 10 wherein the user interface is further for creating a reminder for each of the reminder contacts.

12. The system of claim 9 wherein the prompt includes an option to instruct the sending of the message one of through the network and directly to the destination address.

13. The system of claim 9 wherein the message is at least one of a voice message, an image message, a video message and a text message.

14. The system of claim 9 wherein the message is a text message.

15. The system of claim 9 wherein the destination address is a telephone number.

16. A method comprising:
receiving, from a mobile telephone, an identification of a user, an identification of a contact, a destination address for the contact, a first date on which to prompt the mobile telephone and a plurality of secondary mobile telephones, an identifier of an event, and a second date on which to deliver a message;
prompting the mobile telephone and the secondary mobile telephones on the first date to each record a message to the contact;
receiving a recorded message from the mobile telephone and at least one of the secondary mobile telephones;
receiving an instruction to send each recorded message to the destination address on the second date;
sending a prompt to the mobile telephone before sending the message to the contact, the prompt including an event related offer suggesting purchase of at least one of a product and a service related to the event; and
delivering the message to the contact on the second date;
wherein the event related offer is identified by an event marketing database associating the event with the at least one product and service related to the event.

17. The method of claim 16 wherein the prompt provides an option to have the network deliver the message.

18. The method of claim 17 wherein the prompt provides an option to cancel delivery of the message.

19. The method of claim 16 wherein the message is at least one of a voice message, an image message, a video message and a text message.

20. The system of claim 16 wherein the message is a text message.

21. A method comprising:
receiving, from a primary mobile station, an identification of the primary mobile station, an identification of a contact, a destination address for the contact, a first date on which to prompt the primary mobile station and a plurality of secondary mobile stations, an identifier of an event, and a second date on which to deliver at least one message;
receiving, from the primary mobile station, an identification of each of the plurality of secondary mobile stations designated by the primary mobile station;

prompting the primary mobile station and the secondary mobile stations on the first date to each record a message to the contact;

receiving a recorded message from the primary mobile station and at least one of the secondary mobile stations;

prompting the primary mobile station on the second date from a network before sending the recorded message to the contact, the prompt including an event related offer suggesting purchase of at least one of a product and a service related to the event; and delivering each message to the contact on the date instructed by the primary mobile station;

wherein the event related offer is identified by an event marketing database associating the event with the at least one product and service related to the event.

22. The method of claim 21 wherein the delivering each message includes delivering each message as an individual message to the contact.

23. The method of claim 21 further comprising appending each message from one of the plurality of secondary mobile stations to the message from the primary mobile station and wherein the delivering each message includes delivering the message from the primary mobile station with the appended messages from the plurality of secondary mobile stations.

24. The method of claim 21 wherein the delivering each message includes delivering each message through a wireless network.

25. The method of claim 21 wherein each of the recorded messages is at least one of a voice message, an image message, a video message and a text message.

* * * * *